United States Patent [19]

Weiner et al.

[11] Patent Number: 5,102,067
[45] Date of Patent: Apr. 7, 1992

[54] INTEGRATED HELICOPTER EMPENNAGE STRUCTURE

[75] Inventors: Steven D. Weiner, Orange; Thomas J. Toner, Milford; John J. Occhiato, Derby, all of Conn.

[73] Assignee: United Technologies Corporation, Hartford, Conn.

[21] Appl. No.: 683,903

[22] Filed: Apr. 11, 1991

[51] Int. Cl.$^5$ .............................................. B64C 27/82
[52] U.S. Cl. .................................. 244/17.19; 244/87
[58] Field of Search .............. 244/17.11, 17.19, 17.21, 244/87; 416/238

[56] References Cited

U.S. PATENT DOCUMENTS 2,630,985  3/1953  Sherry .......................... 244/17.19
4,809,931  3/1989  Mouille et al. ................. 244/17.21

FOREIGN PATENT DOCUMENTS

1531461  1/1970  Fed. Rep. of Germany ... 244/17.19
3817978  12/1989  Fed. Rep. of Germany ... 244/17.19

*Primary Examiner*—Galen Barefoot
*Attorney, Agent, or Firm*—Terrance J. Radke

[57] ABSTRACT

An integrated empennage structure is provided for a helicopter embodying a ducted fan antitorque device. The integrated empennage structure includes a shroud that houses the ducted fan antitorque device, a vertical stabilizer, and a horizontal stabilizer. The aerodynamic configurations and/or orientations and the spatial orientations of the shroud, vertical stabilizer, and the horizontal stabilizer are interactively related and optimized to provide yaw stability and directional control and pitch stability and maneuverability required for helicopter flight operations. The shroud is spatially orientated at a first predetermined cant angle with respect to the vertical plane of symmetry of the helicopter fuselage such that the ducted fan antitorque device provides lateral antitorque thrust to counteract main rotor assembly induced torque and a positive vertical force component to enhance the overall lift capability of the helicopter. The vertical stabilizer is spatially orientated at a second predetermined cant angle with respect to the vertical plane and aerodynamically configured with a predetermined camber and/or aerodynamically orientated with a predetermined angle if incidence to provide an antitorque force during forward flight regimes that allows the ducted fan antitorque device to be effectively off-loaded and a negative vertical force component that complements the negative vertical force provided by the horizontal stabilizer. The aerodynamic functioning of the vertical stabilizer allows aerodynamic configuration and/or the aerodynamic orientation of the horizontal stabilizer to be reduced and facilitates the attachment of the horizontal stabilizer in substantially symmetrical relation to the vertical stabilizer. The horizontal stabilizer is aerodynamically configured and orientated to optimize the dynamic pitch stability of the helicopter in the forward flight regimes.

9 Claims, 4 Drawing Sheets

FIG. 5D

INTEGRATED HELICOPTER EMPENNAGE STRUCTURE

DESCRIPTION

1. Technical Field

The present invention is directed to helicopters, and more particularly, to the configuration of an integrated empennage structure for helicopters embodying a ducted fan antitorque device.

2. Related Applications

The subject matter of the present invention is related to co-pending patent applications entitled HELICOPTER ANTITORQUE DEVICE and SHROUD-FIN INTEGRATION SHELF FOR A HELICOPTER EMPENNAGE STRUCTURE.

BACKGROUND OF THE INVENTION

The majority of modern day helicopters embody a single main rotor assembly and an exposed tail rotor assembly (noted exceptions being the Aerospatiale helicopters employing a fenestron tail structure and the McDonnell Douglas helicopters employing a NOTAR TM antitorque device). The exposed tail rotor assembly has proven to be a relatively efficient and reliable means for providing lateral thrust to counteract the fuselage induced torque generated by the main rotor assembly and to provide yaw directional control of the helicopter in hover, transitional, low, and high speed flight regimes.

Exposed tail rotor assemblies, however, present disadvantages from both an aerodynamic and non-aerodynamic point of view. First and foremost, exposed tail rotor assemblies present significant safety hazards during ground operations, i.e., system run-up, hovering, taxiing, and/or parking operations. The exposed tail rotor assembly poses a severe danger to adjacent personnel during ground operations. Personnel have been killed or injured by inadvertent contact with the rotating tail rotor blades of an exposed tail rotor assembly. The operating exposed tail rotor assembly also poses a hazard to other equipment located in areas of helicopter ground operations. In addition, exposed tail rotor assemblies are vulnerable to damage from objects circulated by the slip stream of the main rotor assembly.

The exposed tail rotor assembly also presents problems during helicopter flight operations such as takeoffs, landings, and or maneuvering in confined areas where care must be taken to prevent inadvertent strikes of the exposed tail rotor assembly with terrain features such as power lines, buildings, fences, trees, and bushes. Numerous military applications and some civilian applications require nap of the earth (NOE) flying, sometimes at night or in reduced visibility weather. Flying in such conditions requires extra care to prevent inadvertent strikes of the exposed tail rotor assembly with such terrain features.

In addition, the aerodynamic efficiency of exposed tail rotor assemblies is degraded by various factors arising out of the very nature of such assemblies. An exposed tail rotor assembly is not generally utilized to provide the total required yaw stability in higher speed flight regimes due to drag effects and induced stresses acting on the tail rotor blades. Instead, an aerodynamically-configured vertical stabilizer is incorporated in the configuration of the helicopter empennage to provide a portion of the required yaw stability in higher speed flight regimes. The exposed tail rotor assembly, however, still provides an observable contribution to the total aerodynamic drag in such flight regimes.

To provide the antitorque thrust (lateral lift) required for hover operations and yaw maneuvers during transitional, low, and high speed flight regimes, the typical exposed tail rotor assembly has large diameter tail rotor blades (to reduce the engine power required by the tail rotor assembly to develop such thrust). The tail rotor assembly must be mounted on the vertical stabilizer to provide the necessary ground clearance for the tail rotor blades. Such an arrangement, however, results in aerodynamic interference between the vertical stabilizer and the exposed tail rotor assembly (stabilizer blockage) that reduces the aerodynamic efficiency of the exposed tail rotor assembly. This arrangement may also interfere with the aerodynamic functioning of the vertical tail structure in higher speed flight regimes. In addition, such an arrangement creates an induced roll moment about the longitudinal axis of the helicopter.

Furthermore, an exposed tail rotor assembly is generally a mechanically complex and fragile apparatus that is subjected to severe operating stresses and dynamic phenomena such as relative wind, main rotor assembly and fuselage slip streams and vortices that reduce the operating efficiency thereof. Exposure to such operating conditions tends to limit the overall useful lifetime of an exposed tail rotor assembly such that the costs associated with more frequent maintenance/overhaul are increased. In addition, exposed tail rotor assemblies are subjected to increased blade loading effects during flights at increased sideslip angles, which tends to restrict the effective operating envelope with respect to sideslips for helicopters having exposed tail rotor assemblies.

A helicopter embodying a fenestron or ducted fan antitorque device in the empennage structure provides several aerodynamic and non-aerodynamic advantages over the conventional helicopter configuration. An operating ducted fan antitorque device does not present a significant hazard to adjacent personnel or equipment. Furthermore, the empennage structure effectively shields the ducted fan from damage induced by external objects.

Aerodynamically, a ducted fan antitorque device may be effectively off-loaded in higher speed flight regimes, thereby providing a reduction in total aerodynamic drag in these flight regimes. The vertical stabilizer does not aerodynamically interfere with the operation of a ducted fan antitorque device. The tail rotor assembly of the ducted fan antitorque device is not exposed to external dynamic phenomena such that the overall lifetime of the ducted fan tail rotor assembly is improved, with the concomitant decrease in maintenance requirements. A ducted fan antitorque device effectually reduces stresses experienced by tail rotor blades during sideslipped flight, thereby expanding the operating envelope of helicopters embodying ducted fan antitorque devices. For equivalent rotor defined apertures, the aerodynamic efficiency of the ducted fan antitorque device is greater than that of an exposed tail rotor assembly such that the ducted fan antitorque device may be downsized for incorporation in the empennage structure while still providing substantially equivalent aerodynamic performance. This reduced diameter allows the ducted fan antitorque device to be mounted at a lower waterline, eliminating the induced roll moment about the longitudinal axis of the helicopter as experienced with the exposed tail rotor.

Aerospatiale has produced several lines of helicopters such as the Dauphin and Gazelle that include an empennage structure embodying a ducted fan antitorque device and a vertical stabilizer in combination to provide antitorque thrust and yaw directional control for a helicopter. The ducted fan antitorque devices of these helicopters have an duct axis that is substantially perpendicular to the vertical plane of symmetry of the helicopter, i.e., the tail rotor blade plane is parallel to the vertical plane. The transverse thrust developed by these antitorque devices is sufficient to provide the necessary antitorque force and yaw directional control in the hover, translational, low, and high structure of these helicopters includes a vertical stabilizer that is aerodynamically configured to provide lateral thrust for antitorque and yaw stability at higher forward speeds.

U.S. Pat. No. 4,809,931, issued to Aerospatiale, discloses that such prior art empennage structures do not provide any pitch stability, particularly at higher forward speeds. The '931 patent teaches that a horizontal stabilizing surface is required to provide an empennage structure that provides both static and dynamic yaw and pitch stability as well as the counterbalancing antitorque thrust. The '931 patent further teaches that this type of empennage structure is disadvantageous in that it results in a substantial increase in overall structural weight of the helicopter.

Another prior art empennage structure embodying a ducted fan antitorque device is described in the '931 patent, this prior art empennage structure replacing the vertical and horizontal stabilizers with two aerodynamic surfaces. The '931 patent teaches that the two aerodynamic surfaces extend above a horizontal plane passing through the top of the housing of the ducted fan antitorque device, and that the mean planes of the aerodynamic surfaces are disposed symmetrically with respect to each other about the vertical plane passing through the housing to define a "V" empennage. These aerodynamic surfaces are described as being configured to provide antisymmetrical aerodynamic lift profiles. The '931 patent teaches that such an empennage configuration has not achieved the advantageous results expected.

The subject matter described and claimed in the '931 patent is a helicopter empennage structure embodying a ducted fan antitorque device that simultaneously provides the antitorque force and static and dynamic stability about the yaw and pitch axes. The '931 patent teaches that the mean plane of the ducted fan antitorque housing is slanted with respect to the vertical plane of symmetry of the helicopter in an angular range of 0° to 45°. Two aerodynamic surfaces are joined in combination at the top of the housing to form a "V" empennage extending above the horizontal plane passing through the top of the housing. The '931 patent teaches that the two aerodynamic surfaces are disposed in several different embodiments wherein the respective mean planes of the aerodynamic surfaces extend disymmetrically with respect to the vertical plane of symmetry of the helicopter. The mean plane of the two aerodynamic surfaces are described as forming predetermined angles, selected from a defined range of angles, with respect to the horizontal and vertical, respectively.

SUMMARY OF THE INVENTION

A primary object of the present invention is to provide, for a helicopter embodying a ducted fan antitorque device, an integrated empennage structure that includes vertical and horizontal stabilizers to provide enhanced yaw stability and directional control and pitch stability for the helicopter in hover and forward flight regimes.

Another object of the present invention is to provide an integrated empennage structure for a helicopter that expands the sideslip envelope thereof.

Yet another object of the present invention is to provide an integrated empennage structure that provides a helicopter with improved yaw pointing maneuverability in the forward flight regimes.

One more object of the present invention is to provide an integrated empennage structure wherein a shroud embodying the ducted fan antitorque device is spatially orientated at a predetermined angle with respect to the vertical plane of symmetry of the helicopter fuselage.

Still another object of the present invention is to provide an integrated helicopter empennage structure wherein the vertical stabilizer thereof is spatially orientated at a predetermined angle with respect to the vertical plane of symmetry of the helicopter fuselage.

Yet a further another object of the present invention is to provide an integrated helicopter empennage structure wherein the direction of cant of the vertical stabilizer is opposite to the direction of cant of the ducted fan antitorque device.

One more object of the present invention is to provide an integrated helicopter empennage structure having vertical and horizontal stabilizers aerodynamically optimized to provide enhanced yaw and pitch static stability and maneuverability for hover and forward flight operations.

For helicopter that includes a fuselage, a main rotor assembly, and a tail boom, an integrated empennage structure having a ducted fan antitorque device mounted therein. The integrated empennage structure comprises a shroud integral with the tail boom, a shroud-fin integration shelf, an aft shroud closure, a vertical stabilizer, and a horizontal stabilizer intersecting the vertical stabilizer.

The aerodynamic configurations and/or orientations and the spatial orientations of the shroud, vertical stabilizer, and the horizontal stabilizer are interactively related and optimized to provide the necessary aerodynamic forces for helicopter flight operations. Lateral or antitorque thrust is provided by the empennage structure for yaw stability and directional control of the helicopter in the hover and forward flight regimes. The empennage structure also provides vertical force components for pitch static stability and maneuverability in forward flight operations.

The spatial orientation of the shroud housing the ducted fan antitorque device and the spatial orientation of the vertical stabilizer are interactively related or integrated to provide enhanced aerodynamic performance for the helicopter in the hover and forward flight regimes. The shroud is spatially orientated at a first predetermined cant angle with respect to the vertical plane of symmetry of the helicopter fuselage. The vertical stabilizer is spatially orientated at a second predetermined cant angle with respect to the vertical plane. The second predetermined cant angle is opposite in rotational sense to the first predetermined cant angle with respect to the vertical plane.

The spatial orientation of the shroud improves the aerodynamic performance of the helicopter in the hover regime by providing a positive vertical force component. The spatial orientation of the shroud also improves the center of gravity range of the helicopter in the hover and forward speed flight regimes.

To minimize drag in higher speed forward flight regimes and to simultaneously provide the required antitorque thrust required for yaw stability of the helicopter, the integrated empennage structure incorporates a spatially orientated and aerodynamically configured and orientated vertical stabilizer to provide the majority of the required antitorque thrust in higher speed forward flight regimes. The vertical stabilizer is aerodynamically configured with a predetermined camber and/or aerodynamically orientated at a predetermined angle of incidence, which in combination with the spatial orientation of the vertical stabilizer, provides progressive off-loading of the ducted fan antitorque device with increasing speeds in the forward flight regimes to minimize aerodynamic stresses on the ducted fan antitorque device.

The vertical stabilizer provides the major portion of the antitorque thrust necessary for yaw stability of the helicopter in the higher speed flight regimes. At high speed forward flight regimes, the ducted fan antitorque device is not completely off-loaded, but rather is effectively off-loaded to such a degree that the ducted fan antitorque device is still providing a target level of reduced thrust.

The integrated empennage structure further comprises an aerodynamically configured and integrated horizontal stabilizer that is optimized to provide negative vertical forces for dynamic pitch stability of the helicopter in the forward speed flight regimes. The horizontal stabilizer is disposed in intersecting combination with the vertical stabilizer to minimize main rotor assembly wake impingement effects.

The shroud is spatially orientated at a first predetermined cant angle with respect to the vertical plane of symmetry of the helicopter fuselage. The vertical stabilizer is spatially orientated at a second predetermined cant angle with respect to the vertical plane. The second predetermined cant angle is opposite in rotational sense to the first predetermined cant angle with respect to the vertical plane such that the effective angular displacement between the shroud and the vertical stabilizer is the sum of the first and second predetermined cant angles. Such a spatial orientation allows the horizontal stabilizer to be advantageously mounted in substantially symmetrical relation with respect to the vertical stabilizer.

The magnitude of the first predetermined cant angle is determined by such operating constraints as the cross coupling effects experienced during control range inputs to the ducted fan antitorque device and the specific design mission of the helicopter. A range for the magnitude of the first predetermined cant angle is defined as greater than 0° to about 20°. For one preferred embodiment, the first predetermined cant angle has a magnitude of about 13°.

The magnitude of the second predetermined cant angle is based upon the magnitude of the first predetermined cant angle, and is defined as being at predetermined cant angle to ensure an angle of intersection between the vertical and horizontal stabilizers greater than 90°. A range for the magnitude of the second predetermined cant angle is about 0° to about 15° greater than, and preferably 5° to about 10° greater than, the first predetermined cant angle. For one preferred embodiment, the second predetermined cant angle has a magnitude of about 20°.

The vertical stabilizer is aerodynamically configured with a predetermined camber and/or aerodynamically orientated with a predetermined angle of incidence to provide effective off-loading of the ducted fan antitorque device in the higher speed forward flight regimes. The relative spatial relationship between the shroud and the vertical stabilizer, in combination with the aerodynamic configuration and orientation of the vertical stabilizer, defines an integrated empennage structure that provides antitorque thrust in the hover and forward speed flight regimes for yaw stability and directional control, provides a positive vertical force component in the hover regime to enhance the overall lift capability of the helicopter, effectively off-loads the ducted fan antitorque device in the higher speed forward flight regimes, and provides a negative vertical force component for dynamic pitch stability in the forward flight regimes.

Mass airflow influx into the ducted fan antitorque device is regulated to produce a thrust acting along the axis of the device. Since the axis of the ducted fan antitorque device is effectively offset with respect to the transverse axis of the helicopter by the first predetermined cant angle, the generated thrust may be resolved into an antitorque thrust component in the direction of the transverse axis and a positive vertical force component in the direction of the vertical axis. Mass airflow over the vertical stabilizer produces a lifting force due to the aerodynamic configuration and/or orientation thereof. Since the vertical stabilizer is effectively offset with respect to the transverse axis by the second predetermined cant angle, the lifting force may be resolved into an antitorque force component in the direction of the transverse axis and a negative vertical force in the direction of the vertical axis.

The negative vertical force component provided by the vertical stabilizer complements the negative lifting force provided by the horizontal stabilizer. Consequently, the aerodynamic functioning of the vertical stabilizer allows the aerodynamic configuration and/or orientation of the horizontal stabilizer to be reduced. These aerodynamic effects also facilitate a substantially symmetrical attachment of the horizontal stabilizer in combination with the vertical stabilizer. The horizontal stabilizer is aerodynamically configured with a predetermined camber and/or aerodynamically orientated with a predetermined angle of incidence to optimize the dynamic pitch stability of the helicopter in the forward flight regimes. The horizontal stabilizer is attached at a high vertical stabilizer location to minimize main rotor blade wake impingement effects, and may be mounted in combination with the vertical stabilizer to define a cruciform or a "T" empennage configuration.

BRIEF DESCRIPTION OF THE DRAWINGS

A more complete understanding of the present invention and the attendant advantages and features thereof will be readily comprehended by reference to the following detailed description when considered in conjunction with the accompanying drawings wherein.

DETAILED DESCRIPTION OF PREFERRED EMBODIMENTS

Figure 1:
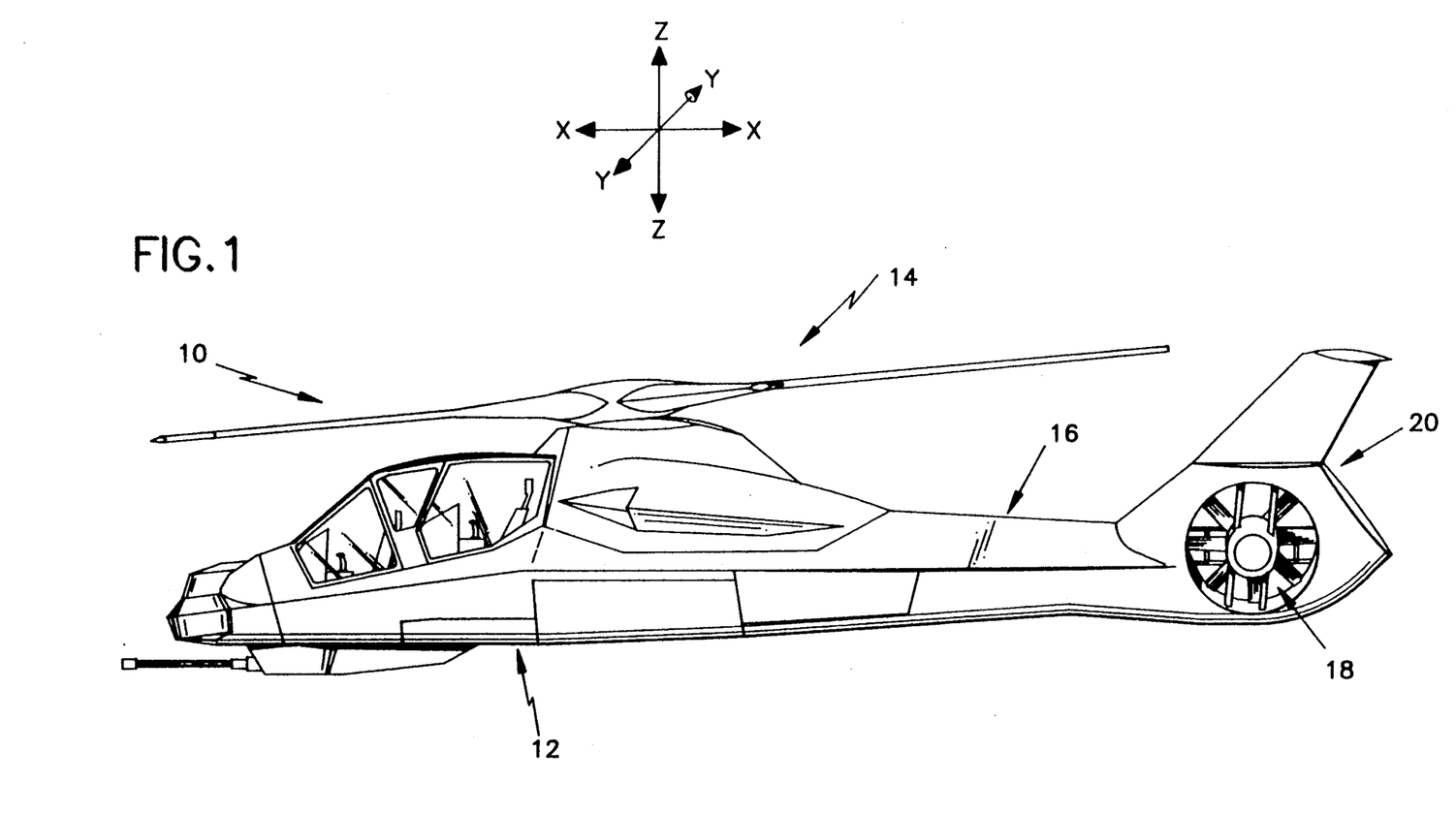
FIG. 1 is a side plan view of a helicopter embodying a ducted fan antitorque device in an integrated empennage structure according to the present invention.
Figures 5A, 5B, 5C, 5D:
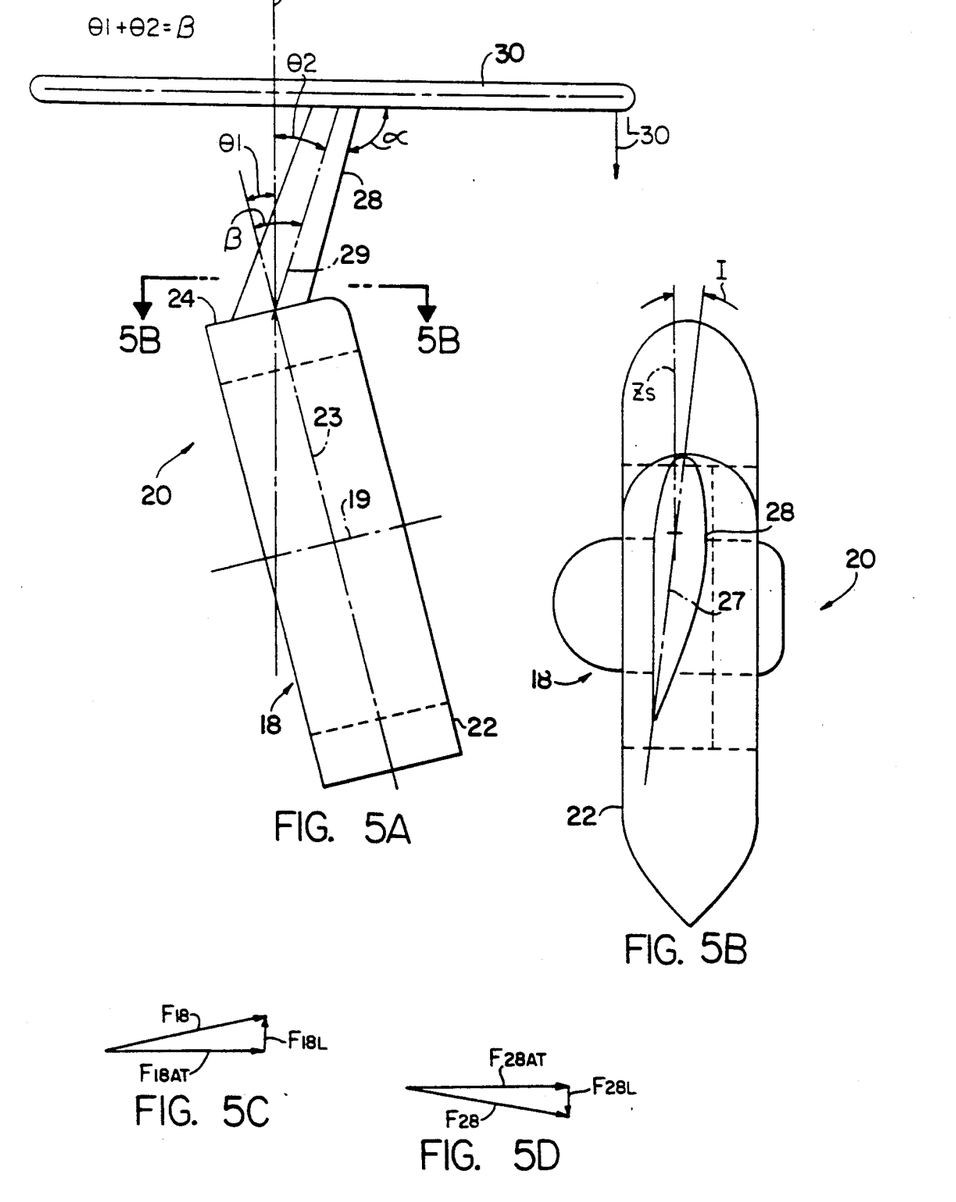
FIG. 5A is a schematic view illustrating the spatial orientation of an integrated empennage structure according to the present invention.
FIG. 5B is a cross-sectional plan view of the integrated empennage structure of FIG. 5A taken along line 5B—5B.
FIG. 5C illustrates the thrust diagram for the ducted fan antitorque device of the integrated empennage structure of FIG. 5A.
FIG. 5D illustrates the force diagram for the vertical stabilizer of the integrated empennage structure of FIG. 5A.

Referring now to the drawings wherein like reference alphanumerics designate corresponding or similar elements throughout the several views, a helicopter 10 embodying a ducted fan antitorque device is illustrated in FIG. 1. The helicopter 10 includes a fuselage 12, a main rotor assembly 14, a tail boom 16, and an integrated empennage structure 20 according to the present invention that includes a ducted fan antitorque device 18. Also illustrated in FIG. 1 is the reference system associated with the helicopter 10 axis, a Y—Y axis defining the lateral axis, and a Z—Z axis defining the vertical axis. A vertical plane Zs, defining the medial plane of symmetry of the helicopter fuselage 12, is shown in FIG. 5A. In the following disclosure, references to the vertical plane Zs should be understood as also encompassing planes parallel to the vertical plane Zs.

The main rotor assembly 14 includes the power system (not shown—typically one to three turbine engines) that provides the profile, induced, parasite and climb power for turning the main rotor blades, lifting the helicopter 10, propelling the helicopter 10 in forward flight, and maneuvering the helicopter 10 in ascents and descents, respectively. The main rotor assembly 14 also includes the transmission system (not shown) that transmits engine power to the main rotor blades and the ducted fan antitorque device 18.

Figure 2:
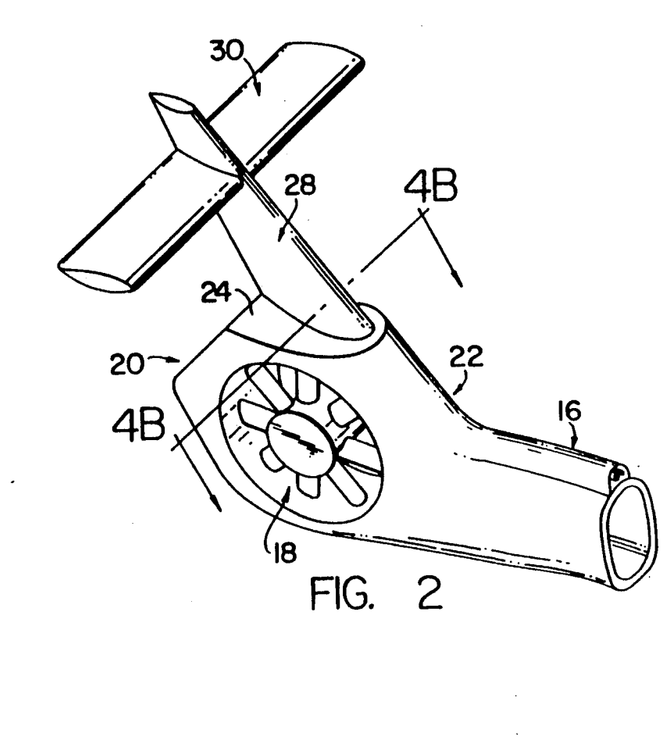
FIG. 2 is a first computerized perspective view of an integrated empennage structure according to the present invention.
Figure 3:
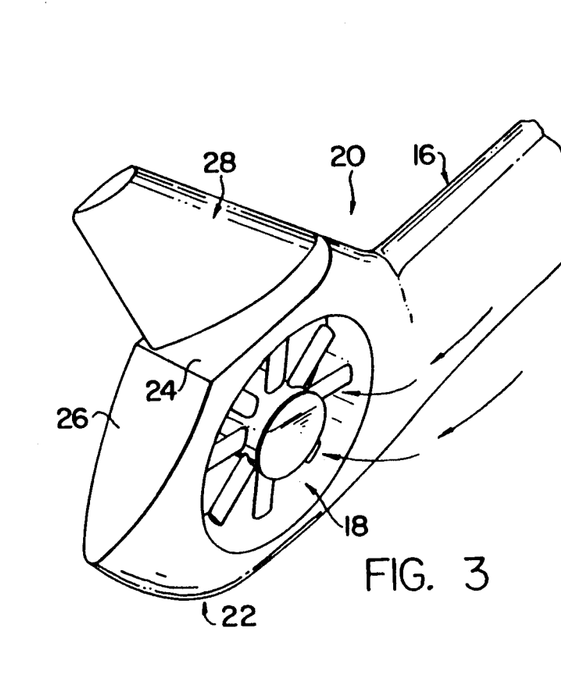
FIG. 3 is a second computerized partial perspective view of an integrated empennage structure according to the present invention.

An exemplary integrated empennage structure 20 according to the present invention is illustrated in further detail in FIGS. 2, 3. The empennage structure 20 includes a shroud 22 integral with the tail boom 16, a shroud-fin integration shelf 24, an aft shroud closure 26, a vertical fin or stabilizer 28, and a horizontal fin or stabilizer 30 intersecting the vertical stabilizer 28. The ducted fan antitorque device 18 is mounted in the shroud 22.

Those skilled in the art will appreciate that the overall aerodynamic performance of the integrated empennage structure 20 of the present invention depends upon both the characteristics of the individual elements comprising the empennage structure 20 and the interactive relationships among these individual elements. The subject matter of the present invention is directed to the characteristics and interactive relationships of the shroud 22, the vertical stabilizer 28, and the horizontal stabilizer 30 comprising the integrated empennage structure 20. The ducted fan antitorque device 18 and the shroud-fan integration shelf 24 and the aft shroud closure 26 of the integrated empennage structure 20 are the subject matter of co-pending patent applications entitled HELICOPTER ANTITORQUE DEVICE and SHROUD-FIN INTEGRATION SHELF FOR A HELICOPTER EMPENNAGE STRUCTURE, respectively. A brief description of the characteristics of these elements is presented in the following paragraphs to facilitate a better understanding of the characteristics of the subject matter of the present invention.

The ducted fan antitorque device 18 provides the aerodynamic thrust required by the helicopter 10 for yaw stability and maneuverability in hover and forward flight operations. In addition, the ducted fan antitorque device 18 provides a vertical lift component that contributes to the overall lift capability of the helicopter 10.

The design dimensions of the ducted fan antitorque device 18 and the operating characteristics thereof such as fan thrust and fan control range are based upon the mission requirements that the helicopter 10 must be capable of achieving. For example, one such set of operating constraints that may drive the design dimensions of the ducted fan antitorque device 18 for one preferred embodiment of the helicopter 10 are a fan power/control range to provide sufficient antitorque thrust in hover in a 45 knot right crosswind to produce a yaw acceleration of 0.85 rad/sec$^2$ (50 deg/sec$^2$). These operating constraints define a helicopter 10 having an antitorque thrust generating capability to achieve a 180° hover turn, stop-to-stop, in five seconds in crosswinds up to about 45 knots.

The ducted fan antitorque device 18 comprises a duct having an axis 19 for mounting the antitorque device 18 in combination within the shroud 22 and a fan assembly mounted within the duct. The duct comprises an inlet having a predetermined lip radius, a diverging section integral with and downstream of the inlet, and an outlet having an exit lip of variable radius. The duct dimensions and configuration are selected to provide an aerodynamically efficient configuration for enhanced mass airflow through the ducted fan antitorque device 18, including an attached, relatively uniform velocity distribution for the mass airflow influx, attached mass airflow through the duct, and reduced wake contraction for the mass airflow efflux.

The fan assembly includes a hub, aerodynamically shaped support arms for mounting the hub in the duct, and a plurality of tail rotor blades attached to the hub. Located within the hub are the tail rotor gearbox and servo controls for regulating the operation of the tail rotor blades. One support arm, disposed radially between the duct and the hub, provides a housing for a control rod and a drive shaft from the transmission system to the servo control and the tail rotor gearbox, respectively. In the one preferred embodiment, two additional support arms are utilized to mount the hub in the duct, the two support arms being disposed non-radially and off-axis between the duct and the hub in collinear relation to one another.

The plurality of tail rotor blades are positioned in a coaxial plane downstream of the inlet a predetermined distance, and the support arms are positioned downstream from the plane of the tail rotor blades. For counterclockwise rotating main rotor blades (as viewed looking down on the helicopter 10), the one preferred embodiment includes eight tail rotor blades having an untapered planform and symmetrically distributed about the hub, which is operative for BBF (bottom blade forward) rotation of the tail rotor blades. The structural configurations of the duct, the tail rotor blades, and the support arms, as well as the spatial positioning of the tail rotor blades and the support arms within the duct, are selected to optimize both the aerodynamic and the acoustic performance of the ducted fan antitorque device 18.

The ducted fan antitorque device 18 is disposed in combination with the shroud 22 to provide a low torque waterline such that the ducted fan antitorque device 18 does not contribute a significant roll moment when collective pitch is increased (which causes a corresponding increase in antitorque thrust). Such a spatial location for the ducted fan antitorque device 18 eliminates the need for mechanical coupling of the lateral cyclic to the collective.

The foregoing brief description of the ducted fan antitorque device 18 was presented to apprise those skilled in the art of the basic structural details and characteristics of the ducted fan antitorque device 18 as a structural and functional element of the empennage structure 20 of the present invention so as to facilitate the structural and functional description of subject matter elements of the integrated empennage structure 20 presented hereinbelow. A more detailed description of the structural and functional characteristics of the antitorque device 18 is presented in commonly-owned, co-pending patent application entitled HELICOPTER ANTITORQUE DEVICE, which is incorporated herein by reference.

The shroud-fin integration shelf 24 and the aft shroud closure 26 have predetermined structural configurations selected to counterbalance specific aerodynamic effects encountered during certain helicopter flight conditions. The shroud-fan integration shelf 24 is the transition structure between the shroud 22 and the vertical stabilizer 28. The shroud-fan integration shelf 24 is configured to separate the mass airflow efflux from the ducted fan antitorque device 18 during nose-right sideslips in higher speed flight regimes. Such mass airflow efflux would otherwise interfere with the aerodynamic operation of the vertical stabilizer 28 during such flight conditions, as described hereinbelow.

The aft shroud closure 26, as its name implies, is the closing structure for the trailing portion of the shroud 22. The aft shroud closure 26 is configured to fix the separation points of mass airflow over the aft portion of the shroud 22. The separation points of the mass airflow would otherwise wander over the aft portion of the shroud 22 during various flight conditions, which would adversely affect the yaw stability of the helicopter 10. A more detailed description of the structural and functional characteristics of the shroud-fin integration shelf 24 and the aft shroud closure 26 is presented in commonly-owned, co-pending patent application entitled SHROUD-FIN INTEGRATION SHELF FOR A HELICOPTER EMPENNAGE STRUCTURE, which is incorporated herein by reference.

The structural and functional characteristics of the empennage structure 20 of the present invention as described in the following paragraphs are based upon a helicopter having a main rotor assembly 14 wherein the main rotor blades rotate in a counterclockwise direction. Consonant with this operating constraint, the ducted fan antitorque device 18 is operative for BBF rotation of the tail rotor blades to provide the required antitorque thrust. It will be appreciated by those skilled in the art, however, that the empennage structure 20 of the present invention may also be utilized in helicopters having clockwise rotation of the main rotor blades (with corresponding rotation of the tail rotor blades). The following disclosure, accordingly, is not intended to limit the scope of the claimed subject matter of the present invention.

The aerodynamic configurations and orientations and the spatial orientations of the shroud 22, vertical stabilizer 28, and the horizontal stabilizer 30 comprising the integrated empennage structure 20 according to the present invention are interactively related and optimized to provide the necessary aerodynamic forces required for helicopter 10 flight operations. Lateral or antitorque thrust is provided by the empennage structure 20 for yaw stability and directional control of the helicopter 10 in the hover and forward flight regimes. The integrated empennage structure 20 also provides vertical force components for pitch static stability and maneuverability in forward flight operations.

The spatial orientation of the shroud 22 housing the ducted fan antitorque device 18 and the spatial orientation of the vertical stabilizer 28 are integrated (interactively related) to provide enhanced aerodynamic performance for the helicopter 10 in the hover and forward flight regimes. The shroud 22 is spatially orientated at a first predetermined cant angle with respect to the vertical plane Zs. The vertical stabilizer 28 is spatially orientated at a second predetermined cant angle with respect to the vertical plane Zs. The second predetermined cant angle is opposite in rotational sense to the first predetermined cant angle with respect to the vertical plane Zs.

The spatial orientation of the shroud 22 improves the aerodynamic performance of the helicopter 10 in the hover regime by providing a positive vertical force component as described in further detail hereinbelow. The spatial orientation of the shroud 22 also improves the center of gravity (C.G.) range of the helicopter 10 in the hover and cruise regimes.

Utilizing the ducted fan antitorque device 18 to provide antitorque thrust in higher speed flight regimes is aerodynamically inefficient inasmuch as such utilization of the ducted fan antitorque device 18 incurs a large drag penalty. This drag penalty is a result of the large volume of air have to be turned into and ingested by the ducted fan antitorque device 18 during high speed forward flight (see FIG. 3). Turning and ingesting such a large volume air flow would create a large momentum drag.

To minimize drag in higher speed forward flight regimes and to simultaneously provide the required antitorque thrust required for yaw stability of the helicopter 10, the integrated empennage structure 20 of the present invention incorporates a spatially orientated and aerodynamically configured and/or orientated vertical stabilizer 28 to provide the majority of the required antitorque thrust in higher speed forward flight regimes. A 30% reduction in drag penalty may be achieved by utilizing the vertical stabilizer 28 to offload the ducted fan antitorque device 18 in higher speed flight regimes since the aerodynamic configuration and/or orientation of the vertical stabilizer 28 is optimized to provide a higher lift to drag ratio than the ducted fan antitorque device 18.

The vertical stabilizer 28 is aerodynamically configured with a predetermined camber and/or aerodynamically orientated at a predetermined angle of incidence. The vertical stabilizer 28, as a result of its spatial orientation (predetermined cant angle), in combination with the aerodynamic configuration and/or orientation thereof, provides progressive off-loading of the ducted fan antitorque device 18 with increasing speeds in the forward flight regimes (off-loading is achieved by reducing the pitch angle of the tail rotor blades as speed increases) to minimize aerodynamic stresses on, and the power requirements of, the ducted fan antitorque device.

The vertical stabilizer 28 provides the major portion (greater than 75% for the one preferred embodiment) of the antitorque thrust necessary for yaw stability of the helicopter 10 in the higher speed flight regimes. At high speed forward flight regimes, the ducted fan antitorque device 18 is not completely off-loaded, but rather is effectively off-loaded to such a degree that the ducted fan antitorque device 18 is still providing a target level of reduced thrust, for example about 110 pounds in the one preferred embodiment.

The dynamic yaw capability of the integrated empennage structure 20, however, allows the antitorque thrust provided by the ducted fan antitorque device 18 to be utilized for "snap turn" maneuvering of the helicopter 10 in the higher speed forward flight regimes ("snap turn" is a coined phrase defining pure yaw pointing maneuvers versus conventional banked turns). At forward speeds of about 70-110 knots, 90° snap turns may be effected in about 2 to about 3.5 seconds (versus 4-5 seconds using aggressive banked turns). The restoring moment provided by the vertical stabilizer 28 provides significant rate damping and positive pedal snap turns.

The integrated empennage structure 20 further comprises an aerodynamically configured and orientated horizontal stabilizer 30 that is optimized, in relation to a predetermined configuration and orientation of the vertical stabilizer 28, to provide negative vertical forces for dynamic pitch stability of the helicopter 10 in the forward flight regimes. The horizontal stabilizer 30 is disposed in intersecting combination with the vertical stabilizer 28 to minimize main rotor assembly 14 wake impingement effects.

To better appreciate the enhanced aerodynamic performance provided by the integrated empennage structure 20 of the present invention, it is necessary to understand the aerodynamic forces generated by the thrust/force producing devices of an empennage structure embodying a ducted fan antitorque device. In an empennage structure embodying a ducted fan antitorque device, thrust augmentation is provided by the shroud structure adjacent the inlet of the ducted fan antitorque device as a result of mass airflow influx into the ducted fan antitorque device. This characteristic of the empennage structure 20 is described in further detail in the co-pending patent application entitled HELICOPTER ANTITORQUE DEVICE. To simplify the following discussion, thrust augmentation provided by the shroud structure has been incorporated with the thrust produced by the ducted fan antitorque device.

Canting the shroud embodying the ducted fan antitorque device with respect to the vertical plane of symmetry of the helicopter fuselage improves the aerodynamic performance of the helicopter in the hover regime and improves the C.G. range of the helicopter in the hover and forward flight regime.. However, canting only the shroud degrades the forward flight aerodynamic performance of the helicopter and reduces the overall efficiency of the empennage structure, as described in the following paragraphs.

Figure 4A:
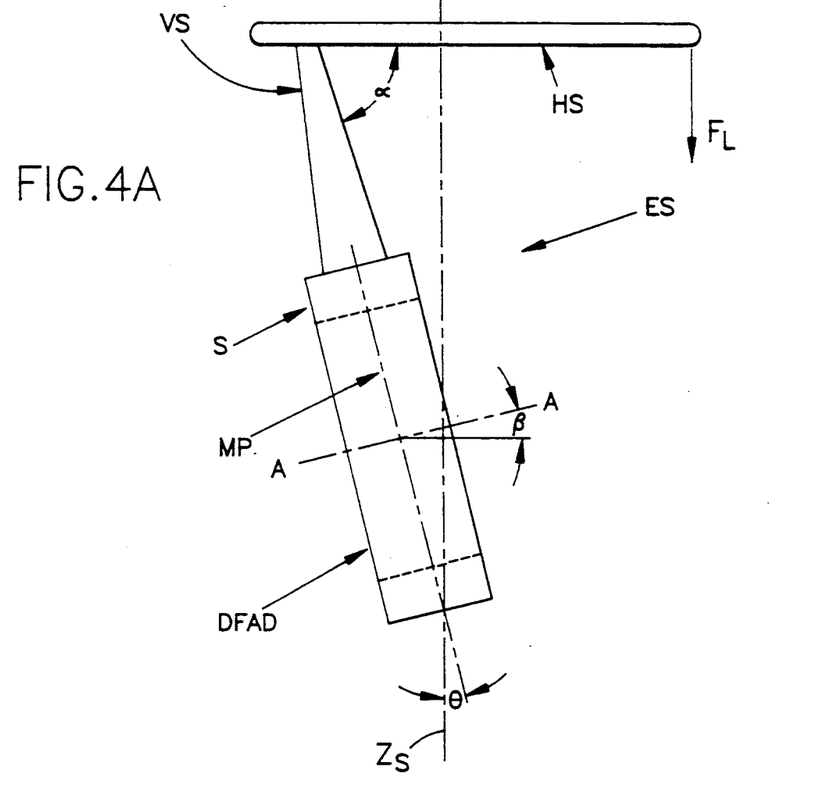
FIG. 4A is a schematic view illustrating one spatial orientation of an empennage structure of a helicopter.

FIG. 4A illustrates a rear view (looking forward along the longitudinal axis X—X) of an empennage structure ES that includes a shroud S embodying a ducted fan antitorque device DFAD, a vertical stabilizer VS, and a horizontal stabilizer HS disposed in intersecting combination with the vertical stabilizer VS. The vertical stabilizer VS is aerodynamically configured and orientated to facilitate off-loading of the ducted fan antitorque device DFAD in the higher speed forward flight regimes. The horizontal stabilizer HS is aerodynamically configured and orientated to provide negative vertical forces to counterbalance the aerodynamic forces and moments generated by the main rotor assembly and the fuselage of the helicopter.

The shroud S is canted at an angle $\theta$ relative to the vertical plane of symmetry Zs of the helicopter fuselage (as shown by the cant angle 8 between the medial plane MP of the shroud S and the vertical plane Zs in FIG. 4A). Due to the cant of the shroud S, the centerline A—A of the ducted fan antitorque device DFAD makes an effective angle $\beta$ (equal to the cant angle $\theta$) with respect to the transverse axis Y—Y of the helicopter. The vertical stabilizer VS of the embodiment of the empennage structure ES illustrated in FIG. 4A is uncanted with respect to the medial plane MP of the shroud S.

The ducted fan antitorque device DFAD and/or the vertical stabilizer VS of the empennage structure ES described in the preceding paragraphs produce positive vertical thrust components in addition to antitorque thrust. In consequence, the horizontal stabilizer HS of the empennage structure ES must produce negative vertical forces of sufficient magnitude to counterbalance not only the aerodynamic forces and moments generated by the main rotor assembly and the fuselage, but also the positive vertical thrust components produced by the ducted fan antitorque device AD and/or the vertical stabilizer VS.

This may be achieved by affixing the horizontal stabilizer HS in an intersecting cantilevered combination with the vertical stabilizer VS, as illustrated in FIG. 4A, and by increasing the planform area and/or the aerodynamic orientation (angle of incidence) of the horizontal stabilizer HS. Increasing the size of the horizontal stabilizer HS results in an empennage structure ES of increased weight. Increasing the angle of incidence of the horizontal stabilizer HS reduces the aerodynamic efficiency of the horizontal stabilizer HS. Mounting the horizontal stabilizer HS in cantilevered combination with the vertical stabilizer VS requires inefficient and heavy attachment fittings to accommodate the increased magnitude of the negative vertical lift produced by such horizontal stabilizer HS. During the forward flight regimes, the horizontal stabilizer HS produces a negative vertical force $F_{-L}$ as schematically illustrated in FIG. 4A.

Figure 4B:
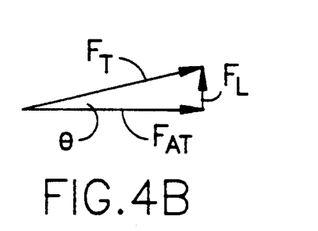
FIG. 4B illustrates the thrust diagram for the ducted fan antitorque device of the empennage structure of FIG. 4A.

During hover and forward flight regimes, the mass airflow influx into the ducted fan antitorque device DFAD, as depicted in FIG. 3, is regulated to produce a thrust $F_T$ acting along axis A—A as illustrated in FIG. 4B. Since the axis A—A is offset with respect to the transverse axis Y—Y by the cant angle $\theta$, the generated thrust $F_T$ may be resolved into an antitorque thrust component $F_{AT}$ (in the direction of the transverse axis Y—Y) and a positive force component $F_L$ (in the direction of the vertical axis Z—Z).

Figure 4C:
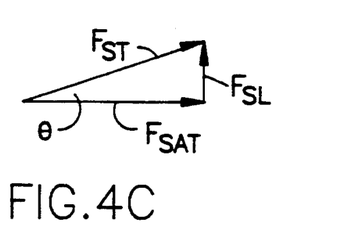
FIG. 4C illustrates the thrust diagram for the vertical stabilizer of the empennage structure of FIG. 4A.

FIG. 4C illustrates the force diagram for the aforedescribed vertical stabilizer VS during forward flight regimes. Mass airflow over the vertical stabilizer VS produces a lifting force $F_{ST}$ due to the aerodynamic configuration and/or orientation of the vertical stabilizer VS. Since the vertical stabilizer VS is effectively canted at the cant angle $\theta$ with respect to the transverse axis Y—Y, the lifting force $F_{ST}$ may also be resolved into an antitorque force component $F_{SAT}$ and a positive vertical force component $F_{SL}$.

In the hover regime, the antitorque thrust component $F_{AT}$ produced by the ducted fan antitorque device DFAD provides the antitorque force to counterbalance the moment-inducing effects of the main rotor assembly and to provide yaw directional control. In translational-to-low speed forward flight regimes, the antitorque force to counterbalance the moment-inducing effects of the main rotor assembly is provided by a combination of the antitorque thrust component $F_{AT}$ produced by the ducted fan antitorque device DFAD and the antitorque force component $F_{SAT}$ produced by mass airflow over the vertical stabilizer VS (ducted fan antitorque device DFAD is progressively off-loaded at higher speeds by the vertical stabilizer VS as described above). In higher speed forward flight regimes, the majority of the antitorque force is effectively provided by the antitorque force component $F_{SAT}$ produced by mass airflow over the vertical stabilizer VS (ducted fan antitorque device DFAD is generally off-loaded to some minimal thrust to minimize the power required by the ducted fan antitorque device DFA and to minimize the aerodynamic stresses on the fan assembly).

Thus, in the hover or forward flight regimes, the empennage structure ES illustrated in FIG. 4A produces, in addition to the antitorque forces necessary for yaw stability and yaw directional control, positive vertical force components that adversely affect the pitch stability of the helicopter. These positive vertical force components must be counterbalanced by means of the horizontal stabilizer HS described hereinabove to restore pitch stability. Such a horizontal stabilizer HS, however, has a negative impact on the weight and aerodynamic efficiency of the empennage structure ES as described hereinabove. An examination of FIG. 4A shows that the horizontal stabilizer HS makes an acute angle $\alpha$ intersection with respect to the vertical stabilizer VS. Such an orientation places the suction surface of the cambered horizontal stabilizer HS in proximity to the suction surface of the cambered vertical stabilizer, which results in aerodynamic interference between the vertical and horizontal stabilizers VS, HS that reduces the aerodynamic performance of the empennage structure ES.

The empennage structure 20 according to the present invention is exemplarily illustrated in FIG. 5A, a rear view looking forward along the longitudinal axis X—X. To overcome the inherent aerodynamic disadvantages of the empennage structure ES illustrated in FIG. 4A, the shroud 22 embodying the ducted fan antitorque device 18 is spatially orientated at a first predetermined cant angle with respect to the vertical plane of symmetry Zs of the helicopter fuselage 12. The vertical stabilizer 28 is spatially orientated at a second predetermined cant angle with respect to the vertical plane Zs. The second predetermined cant angle is opposite in rotational sense to the first predetermined cant angle with respect to the vertical plane Zs, as illustrated in FIG. 5A, such that the effective angular displacement between the medial plane 23 of the shroud 22 and the vertical stabilizer 28 is the sum of the first and second predetermined cant angles. Such a spatial orientation allows the horizontal stabilizer 30 to be advantageously mounted in substantially symmetrical relation with respect to the vertical stabilizer 28, as described in further detail hereinbelow.

The shroud 22 embodying the ducted fan antitorque device 18 is spatially orientated (canted) at a first predetermined cant angle $\theta 1$ relative to the vertical plane $Z_s$ (as illustrated in FIG. 5A, the cant angle $\theta 1$ between the medial plane 23 of the shroud 22 and the vertical plane Zs). The magnitude of the first predetermined cant angle $\theta 1$ is determined by such operating constraints as the cross coupling effects experienced during control range inputs to the ducted fan antitorque device 18, particularly with respect to heading tolerance limits, and the specific design mission of the helicopter 10. For the one preferred embodiment, the input control range is about $-35$ to about $+50$ degrees of pitch.

Based upon a control range input to the ducted fan antitorque device 18 of about $-35$ to about $+50$ degrees of pitch and other operating constraints as exemplarily described hereinabove, the inventors have defined a range for the magnitude of the first predetermined cant angle $\theta 1$ of greater than 0° to about 20°. The magnitude of the first predetermined cant angle $\theta 1$ for the one preferred embodiment of the helicopter 10 (having a flyaway weight of about 10,100 lbs [about 4581 kg]; maximum antitorque thrust generation in a hover in a 45 knot right crosswind sufficient to generate a yaw acceleration of 0.85 rad/sec$^2$ to provide a 180° hover turn capability, stop-to-stop, in less than about 5 seconds) is about 13°.

The vertical stabilizer 28 is spatially orientated (canted) at a second predetermined cant angle $\theta 2$ relative to the vertical plane $Z_s$ (as illustrated in FIG. 5A, the cant angle $\theta 2$ between the medial plane 29 of the vertical stabilizer 21, at the forward edge thereof, and the vertical plane Zs). The magnitude of the second predetermined cant angle $\theta 2$ is based upon the magnitude of the first predetermined cant angle $\theta 1$. The second predetermined cant angle $\theta 2$ has a magnitude at least as great as the magnitude of the first predetermined cant angle $\theta 1$ to ensure that the intersection angle $\alpha$ between the vertical stabilizer 28 and the horizontal stabilizer 30 is greater than 90°. This characteristic minimizes aerodynamic interference between the vertical and horizontal stabilizers 28, 30.

The inventors have defined a range for the magnitude of the second predetermined cant angle $\theta 2$ based upon the minimization of aerodynamic interference effects between the vertical and horizontal stabilizers 28, 30 of about 0° to about 15° greater than the first predetermined cant angle $\theta 1$, and preferably about 5° to about 10° greater. The magnitude of the second predetermined cant angle $\theta 2$ for the one preferred embodiment of the helicopter 10 defined hereinabove is about 20°

(about 7° greater than the first predetermined cant angle $\theta 1$.

An examination of FIG. 5A shows that the spatial orientation of the shroud 22 is opposite in sense to the spatial orientation of the vertical stabilizer 28. That is, the first predetermined cant angle $\theta 1$ is counterclockwise with respect to the vertical plane Zs while the second predetermined cant angle $\theta 2$ is clockwise with respect to the vertical plane Zs. The effective angular displacement $\beta$ between the shroud 22 and the vertical stabilizer 28 is the sum of the first predetermined cant angle $\theta 1$ and the second predetermined cant angle $\theta 2$. The relative spatial relationship between the shroud 22 and the vertical stabilizer 28 of the integrated empennage structure 20 according to the present invention defines an integrated shroud 22, vertical stabilizer combination 28 that provides antitorque thrust in the hover and forward speed flight regimes for yaw stability and direction control, provides a positive vertical force component in the hover regime to enhance the overall lift capability of the antitorque device 18 in the higher speed forward flight regimes to enhance helicopter aerodynamic performance in these flight regimes, and provides a negative vertical force component for dynamic pitch stability in the forward flight regimes.

The vertical stabilizer 28, based upon the spatial orientation described in the preceding paragraphs, is aerodynamically configured and/or orientated with a predetermined camber C and/or a predetermined angle of incidence I, respectively, to provide effective off-loading of the ducted fan antitorque device 18 in the higher speed forward flight regimes. Aerodynamic factors affecting the sizing and configuration of the vertical stabilizer 28 include effective area, aspect ratio "carry-through" and horizontal stabilizer 30 endplating. The vertical stabilizer 28 should not be oversized as this would increase induced drag in the higher speed forward flight regimes.

For the one preferred embodiment, a NASA 63$_3$A618 airfoil section (providing a 4° effective incidence through its predetermined camber C) was selected as the airfoil configuration for the vertical stabilizer 28 to provide the lateral force necessary to effectively off-load the ducted fan antitorque device 18 in the higher speed forward flight regimes. Other relevant dimensions for the one preferred embodiment of the vertical stabilizer 28 include a stabilizer area S of about 15.5 ft$^2$, a span b of about 4.1 ft (49 inches), a mean chord $C_m$ of about 43.6 inches, and an aspect ratio AR of about 1.07.

A predetermined angle of incidence I for the vertical stabilizer 28 is schematically illustrated in FIG. 5B, and is defined as the angle I between the chord 27 of the vertical stabilizer 28 and the vertical plane Zs. One selection criteria for the predetermined angle of incidence I is a magnitude sufficient for the vertical stabilizer 28 to develop an aerodynamic lift force that effectively off-loads the ducted fan antitorque device 18 to a target value in the higher speed forward flight regimes. For the one preferred embodiment, with an off-load target value of about 110 pounds, the predetermined angle of incidence I was about 4. The vertical stabilizer 28, with a 4° angle of incidence, provides about 75% of the required antitorque thrust at $V_{max}$ (about 170 knots).

The thrust diagram for the ducted fan antitorque device 18 embodied in the integrated empennage structure 20 of the present invention is depicted in FIG. 5C. Mass airflow influx into the ducted fan antitorque device 18 is regulated to produce a thrust $F_{18}$ acting along the axis 19 of the ducted fan antitorque device 18. Since the axis 19 of the ducted fan antitorque device 18 is offset with respect to the transverse axis Y—Y by the first predetermined cant angle $\theta 1$ (due to the spatial orientation of the shroud 22), the generated thrust $F_{18}$ may be resolved into an antitorque thrust component $F_{18AT}$ in the direction of the transverse axis Y—Y and a positive vertical force component $F_{18L}$ in the direction of the vertical axis Z—Z.

The force diagram for the vertical stabilizer 28 of the integrated empennage structure 20 as described in the preceding paragraphs is depicted in FIG. 5D. Mass airflow over the vertical stabilizer 28 produces an aerodynamic lifting force $F_{28}$ due to the aerodynamic configuration and/or orientation of the vertical stabilizer 28. Since the vertical stabilizer 28 is offset with respect to the transverse axis Y—Y by the second predetermined cant angle $\theta 2$, the lifting force $F_{28}$ may be resolved into an antitorque force component $F_{28AT}$ in the direction of the transverse axis Y—Y and a negative vertical force component $F_{28L}$ in the direction of the vertical axis Z—Z.

The negative vertical force component $F_{28L}$ provided by the vertical stabilizer 28 complements the negative lifting force $L_{30}$ (see FIG. 5A) provided by the horizontal stabilizer 30. Consequently, the aerodynamic functioning of the vertical stabilizer 28 allows the aerodynamic configuration and/or orientation of the horizontal stabilizer 30 to be reduced. These reductions result in weight savings and/or improved aerodynamic efficiency (through reduction in induced drag) for the integrated empennage structure 20.

Furthermore, the aerodynamic effects produced by the aerodynamic operation of the vertical stabilizer 28 facilitates a substantially symmetrical attachment of the horizontal stabilizer 30 in combination with the vertical stabilizer 28 as illustrated in FIG. 5A. Smaller dynamic forces are transferred through the attachment fitting with the result that the fitting may be reduced in size and weight. In addition, aerodynamic interference between the cambered surfaces of the vertical and horizontal stabilizers 28, 30 is minimized by the obtuseness of the intersection angle $\alpha$ between the horizontal and vertical stabilizers 28, 30, which effectively spaces the respective suction surfaces of the vertical and horizontal stabilizers 28, 30 a greater distance apart.

The horizontal stabilizer 30 is aerodynamically configured and orientated to optimize the dynamic pitch stability of the helicopter 10 in the forward flight regimes. The horizontal stabilizer 30 has an unswept planform and a relatively high aspect ratio. For the one preferred embodiment, the horizontal stabilizer 30 has an aerodynamic configuration that includes an area S of about 25 ft$^2$, a span b of about 9.25 feet (111 inches), a mean chord Cm of about 32.5 inches, and an aspect ratio AR of about 3.42. The one preferred embodiment incorporates a NACA 63$_1$A212 airfoil section.

With reference to FIG. 2, the horizontal stabilizer 30 is mounted in combination with the vertical stabilizer 28 to define a "T" configuration. It is within the scope of the present invention to mount the horizontal stabilizer 30 in combination with the vertical stabilizer 28 to define a cruciform empennage configuration. In either embodiment, the horizontal stabilizer 30 is attached at a high vertical stabilizer 28 location to minimize main rotor blade wake impingement effects on mass airflow over the horizontal stabilizer 30. The angle of incidence of the horizontal stabilizer 30 is relatively low, and is based upon a compromise between longitudinal control margins and vibrations induced by the wake from the main rotor assembly 14. For the one preferred embodiment, an angle of incidence of 5° leading edge up provides satisfactory dynamic pitch stability.

The integrated empennage structure 20 of the present invention provides advantages other than those described in the preceding paragraphs. The integrated empennage structure 20 provides the capability for unrestricted yaw pointing maneuvers (360° snap turns) up to about 80 knots, and accommodates restricted yaw maneuvers (90° to 30° snap turns) up to about 140 knots. Furthermore, the integrated empennage structure 20 provides a significantly large sideslip envelope out to $V_{max}$. Large sideslip angles may be sustained without the high blade loading customarily experienced by helicopters having exposed tail rotor assemblies. The integrated empennage structure 20 effectively eliminates angle of attack effects experienced by exposed tail rotor blades in sideslip flight regimes. The integrated empennage structure 20 also allows increased allowable roll rates in the higher speed forward flight regimes.

A variety of modifications and variations of the present invention are possible in light of the above teachings. It is therefore to be understood that, within the scope of the appended claims, the present invention may be practiced otherwise than as specifically described hereinabove.

What is claimed is:

1. For a helicopter embodying a ducted fan antitorque device having an axis, the helicopter including a main rotor assembly providing power for helicopter lifting and flight operations, a fuselage defined by a vertical plane of symmetry, and a tail boom integral with the fuselage, an integrated empennage structure, comprising:

shroud means contiguous with the tail boom of the helicopter and configured for housing the ducted fan antitorque device therein with the axis of the ducted fan antitorque device disposed transversely with respect to said shroud means, said shroud means being spatially orientated at a first predetermined cant angle with respect to the vertical plane of symmetry wherein the axis of the ducted fan antitorque device is canted at said first predetermined cant angle with respect to the transverse axis of the helicopter, operation of the ducted fan antitorque device producing a thrust along the axis thereof that may be resolved into a transverse antitorque thrust component for yaw stability and directional control of the helicopter and a positive vertical force component contributing to the lift capability of the main rotor assembly;

vertical stabilizer means contiguous with said shroud means and aerodynamically configured and orientated for producing a lifting force in response to mass airflow thereover, said vertical stabilizer means being spatially orientated at a second predetermined cant angle with respect to the vertical plane of symmetry wherein said lifting force may be resolved into a transverse antitorque force component for effectively off-loading the ducted fan antitorque device in higher speed forward flight regimes and a negative vertical force component contributing to dynamic pitch stability and maneuverability of the helicopter; and horizontal stabilizer means mounted in fixed combination with said vertical stabilizer means distal said shroud means and aerodynamically configured and orientated for providing a negative vertical force for dynamic pitch stability and maneuverability of the helicopter in forward speed flight regimes;

said first and second predetermined cant angles being interactively related wherein said vertical stabilizer means provides the major portion of said transverse antitorque force necessary for yaw stability of the helicopter in high speed forward flight regimes;

said interactive relationship between said first and second predetermined cant angles facilitating attachment of said horizontal stabilizer means in substantially symmetrical intersecting combination with said vertical stabilizer means.

2. The integrated empennage structure of claim 1 wherein said first predetermined cant angle has a first angular direction with respect to the vertical plane and said second predetermined cant angle has a second angular direction with respect to the vertical plane, said first angular direction and said second angular direction having opposed rotational sense wherein said first and second predetermined cant angles in combination define an effective angular displacement between said shroud means and said vertical stabilizer means.

3. The integrated empennage structure of claim 1 wherein said first predetermined cant angle has a value within the range of greater than 0° to about 20°.

4. The integrated empennage structure of claim 3 wherein said first predetermined cant angle has a value of about 13°.

5. The integrated empennage structure of claim 1 wherein said second predetermined cant angle has a value at least as great as said first predetermined cant angle.

6. The integrated empennage structure of claim 1 wherein said second predetermined cant angle has a value within the range of about 0° to about 15° greater than said first predetermined cant angle.

7. The integrated empennage structure of claim 6 wherein said second predetermined cant angle has a value of about 20°.

8. The integrated empennage structure of claim 1 wherein said substantially symmetrical intersecting combination of said horizontal stabilizer means with said vertical stabilizer means defines a cruciform configuration.

9. The integrated empennage structure of claim 1 wherein said substantially symmetrical intersecting combination of said horizontal stabilizer means with said vertical stabilizer means defines a "T" configuration.

* * * * *

UNITED STATES PATENT AND TRADEMARK OFFICE
CERTIFICATE OF CORRECTION

PATENT NO. : 5,102,067

DATED : April 7, 1992

INVENTOR(S) : Steven D. Weiner; Thomas J. Toner; John J. Occhiato

It is certified that error appears in the above-identified patent and that said Letters Patent is hereby corrected as shown below:

ON THE TITLE PAGE
In the Abstract:
2nd Column, line 17, "if" shoudl read --of--

Column 5, line 66, after "as being at" insert --least as great as the magnitude of the first--

Claim 2, Colum 18, line 29, "sense" should read --senses--

Signed and Sealed this

Tenth Day of August, 1993

Attest:

MICHAEL K. KIRK

Attesting Officer

Acting Commissioner of Patents and Trademarks